(12) United States Patent
Alvarado et al.

(10) Patent No.: US 7,642,899 B2
(45) Date of Patent: Jan. 5, 2010

(54) VEHICLE OBSERVATION APPARATUS

(76) Inventors: Julio Alvarado, 12553 Chippenham Ct., Bristow, VA (US) 20136; Douglas Masztak, 7363 Hilly La., Warrenton, VA (US) 20187

( * ) Notice: Subject to any disclaimer, the term of this patent is extended or adjusted under 35 U.S.C. 154(b) by 433 days.

(21) Appl. No.: 11/725,705

(22) Filed: Mar. 19, 2007

(65) Prior Publication Data

US 2007/0228755 A1 Oct. 4, 2007

Related U.S. Application Data

(60) Provisional application No. 60/783,124, filed on Mar. 17, 2006.

(51) Int. Cl.
*B60Q 1/00* (2006.01)

(52) U.S. Cl. .............. 340/425.5; 340/426.23; 340/426.24; 340/426.26; 340/461; 340/685; 340/693.9; 340/937; 348/61; 348/73; 348/82; 348/158

(58) Field of Classification Search .............. 340/425.5, 340/426.1, 426.23, 426.24, 426.26, 461, 340/521, 937, 685, 693.9; 348/61, 73, 82, 348/158

See application file for complete search history.

(56) References Cited

U.S. PATENT DOCUMENTS

| 3,554,317 A | 1/1971 | Birbanescu et al. |
|---|---|---|
| 4,831,531 A | 5/1989 | Adams et al. |
| 4,993,068 A | 2/1991 | Piosenka et al. |
| 5,406,324 A | 4/1995 | Roth |
| 5,454,042 A | 9/1995 | Drever |
| 5,572,837 A * | 11/1996 | Featherstone et al. ......... 52/118 |
| 6,369,849 B1 | 4/2002 | Rzyski |
| 6,442,240 B1 | 8/2002 | Otto |
| 6,484,456 B1 * | 11/2002 | Featherstone et al. ......... 52/118 |
| 6,591,786 B1 | 7/2003 | Davis |
| 6,611,200 B2 * | 8/2003 | Pressnall et al. ......... 340/425.5 |
| 2004/0024502 A1 | 2/2004 | Squires et al. |

FOREIGN PATENT DOCUMENTS

JP 9-48584 2/1997

* cited by examiner

*Primary Examiner*—Hung T. Nguyen
(74) *Attorney, Agent, or Firm*—Hoang Steve Ngo

(57) ABSTRACT

The present invention is a vehicle observation apparatus for reducing the risk of injury to law enforcement persons during vehicle stops. The invention is also a vehicle equipped with the vehicle observation apparatus. In an embodiment, the apparatus may include a mast being mountable to and deployable from a law enforcement vehicle, means for two-way communication and observation secured about one end of the mast, means for operating the mast, and means for operating the means for two-way communication and observation. The mast may be telescopic and adapted to be placed in at least a first position and a second position, or may be non-telescopic and in an extended position when in use. In another embodiment, the invention may be a similar apparatus wherein the mast is mountable to and deployable from a check point structure.

31 Claims, 12 Drawing Sheets

VEHICLE OBSERVATION APPARATUS

CROSS-REFERENCE TO RELATED APPLICATIONS

This application claims the benefit of U.S. Provisional Application No. 60/783,124, filed on Mar. 17, 2006, which is hereby incorporated by reference in its entirety.

FIELD OF THE INVENTION

The present invention is directed to vehicle observation systems and devices, and vehicles equipped with vehicle observation systems or devices. More specifically, the invention is a vehicle observation apparatus for reducing the risk of injury to law enforcement persons during vehicle stops. The invention is also a vehicle equipped with a vehicle observation apparatus for reducing the risk of injury to law enforcement persons during vehicle stops.

BACKGROUND OF THE INVENTION

One of the most dangerous situations confronting a law enforcement person or officer in the officer's daily job is a vehicle or traffic stop. Vehicle stops conducted by law enforcement persons often take place in the dark of night and/or on an isolated road. During the vehicle stop, the officer must pull over a vehicle, such as an automobile, truck, or motorcycle, for reasons related to a violation of a law, to a suspicious act, or to a random vehicle stop.

Vehicle or traffic stops are performed thousands of times per year. In a 1999 Department of Justice study, it was reported that about 19,300,000 stops were performed throughout the United States. In many of these stops, a law enforcement person or officer approaches a stopped vehicle without knowing the identity of the driver or how many passengers are in the stopped vehicle. These situations are very dangerous for a law enforcement person performing his or her duty. Many of these stops have resulted in law enforcement persons being injured, shot, or killed and the assailants disappearing without leaving a clue as to the identity of the assailants.

Other hazards associated with vehicle stops include dangerous weather and road conditions. These conditions can be further complicated by vehicles traveling at high speeds in total darkness near the scene. These dangerous situations frequently arise during the course of a vehicle stop. Generally during a vehicle stop, a law enforcement person or officer leaves the safety of his vehicle to gather information about the driver and any passenger(s) of the stopped vehicle, ask questions, provide information, and assess the situation.

One of the first tactical steps a law enforcement person or officer will take when a vehicle is stopped is to align his vehicle slightly to the left behind the stopped vehicle in a manner such to provide protection for him and/or his partner when one or both of the officers are getting out of the law enforcement vehicle. This position creates a barrier or protected path that will also be used as one or both of the officers are positioned in front of the law enforcement vehicle's window.

It is not always possible for a law enforcement vehicle to establish a protected path because of road width, terrain, or situations that do not allow for the preferred method of alignment to the stopped vehicle. The law enforcement person or officer must then leave the safety of his vehicle to gather the required information associated with the cause of the stop. At this point, the law enforcement person is in the most vulnerable situation because he is outside the safety of his vehicle. Beyond the problem associated with the unknown driver is the problem associated with weather. Inclement weather creates a situation of poor visibility and places a law enforcement person in harms way of passing vehicles.

Some measures and approaches have been taken to minimize and assist in reducing the probability of injury or death to law enforcement persons or officers during vehicle or traffic stops, yet these measures still place law enforcement persons in harms way by requiring them to leave the safety of their vehicles. Some proposed and/or current safety measures and approaches include: handheld investigative devices, such as fingerprint readers or scanners or facial recognition scanners, RFID readers, RFID tags, and licenses with embedded information. These technologies help law enforcement persons or officers with preliminary identification. Yet, they all place law enforcement officers in harms way at some point in the investigative process because of the close proximity that is required for identification. That is, the officers must verify personal assigned or vehicle-related items, such as driver's licenses, identification cards, vehicle registration cards, and vehicle insurance documentation, which the drivers and passengers may possess.

Another problem that is not addressed by the above-mentioned measures and approaches is the inability to perform a visual look or search of the inside of the stopped vehicle for a person hiding and/or concealing a weapon.

Another frightening situation that confronts parking attendants or other types of law enforcement persons, such as military personnel or security guards, occurs when a vehicle stops at a check point location or structure, such as a security booth, a parking garage booth, or a kiosk. In these types of situations, at least one attendant or law enforcement person is placed in harm's way because the attendant or law enforcement person is generally only a very short distance away from the stopped vehicle. Thus, the driver and any passenger(s) and/or harmful weapons or cargo can pose great danger to the attendant or law enforcement person.

SUMMARY OF THE INVENTION

The present invention is a vehicle observation apparatus for reducing the risk of injury to law enforcement persons during vehicle stops. The invention is also a vehicle equipped with a vehicle observation apparatus for reducing the risk of injury to law enforcement persons during vehicle stops.

In a first embodiment, the present invention is a vehicle observation apparatus that includes a telescopic mast or boom deployable from a law enforcement vehicle, means for two-way communication and observation secured about one end of the telescopic boom, means for operating the telescopic boom, and means for operating the means for two-way communication and observation. The apparatus may also include means for adjusting positioning of the mast and a mast rotator.

The telescopic boom has a first end and a second end, and may be mounted to the top of the roof of the law enforcement vehicle. The means for two-way communication and observation provides for observation of the interior and at least one occupant of a stopped vehicle during the vehicle stop and for two-way communication between a law enforcement person in connection with the law enforcement vehicle and the at least one occupant in the stopped vehicle.

In a second embodiment, the present invention is a vehicle equipped with a vehicle observation apparatus, such as the apparatus described in the first embodiment, for reducing the risk of injury to law enforcement persons during vehicle stops.

In a further embodiment, the present invention is a vehicle observation apparatus that includes a boom deployable from a check point location or structure, means for two-way communication and observation secured about one end of the boom, means for operating the boom, and means for operating the means for two-way communication and observation. The apparatus may also include means for adjusting positioning of the mast.

The boom has a first end and a second end, and may be mounted to the check point structure. The means for two-way communication and observation provides for observation of the interior and at least one occupant of a stopped vehicle during the vehicle stop and for two-way communication between a law enforcement person in connection with the check point structure and the at least one occupant in the stopped vehicle.

In an additional embodiment, the vehicle observation apparatus of the present invention may include a boom deployable from a law enforcement vehicle or check point location or structure, means for two-way communication and observation secured to the boom, means for operating the boom, means for operating the means for two-way communication and observation, means for adjusting positioning of the mast, a mast rotator, and an articulated joint interfaced with the mast and the means for two-way communication and observation.

It is obvious to one of ordinary skill in the art that the vehicle observation apparatus of the present invention may include a mast or boom that is non-telescopic but is in an extended position when in use so that the present invention may still perform effectively.

Figure 1:
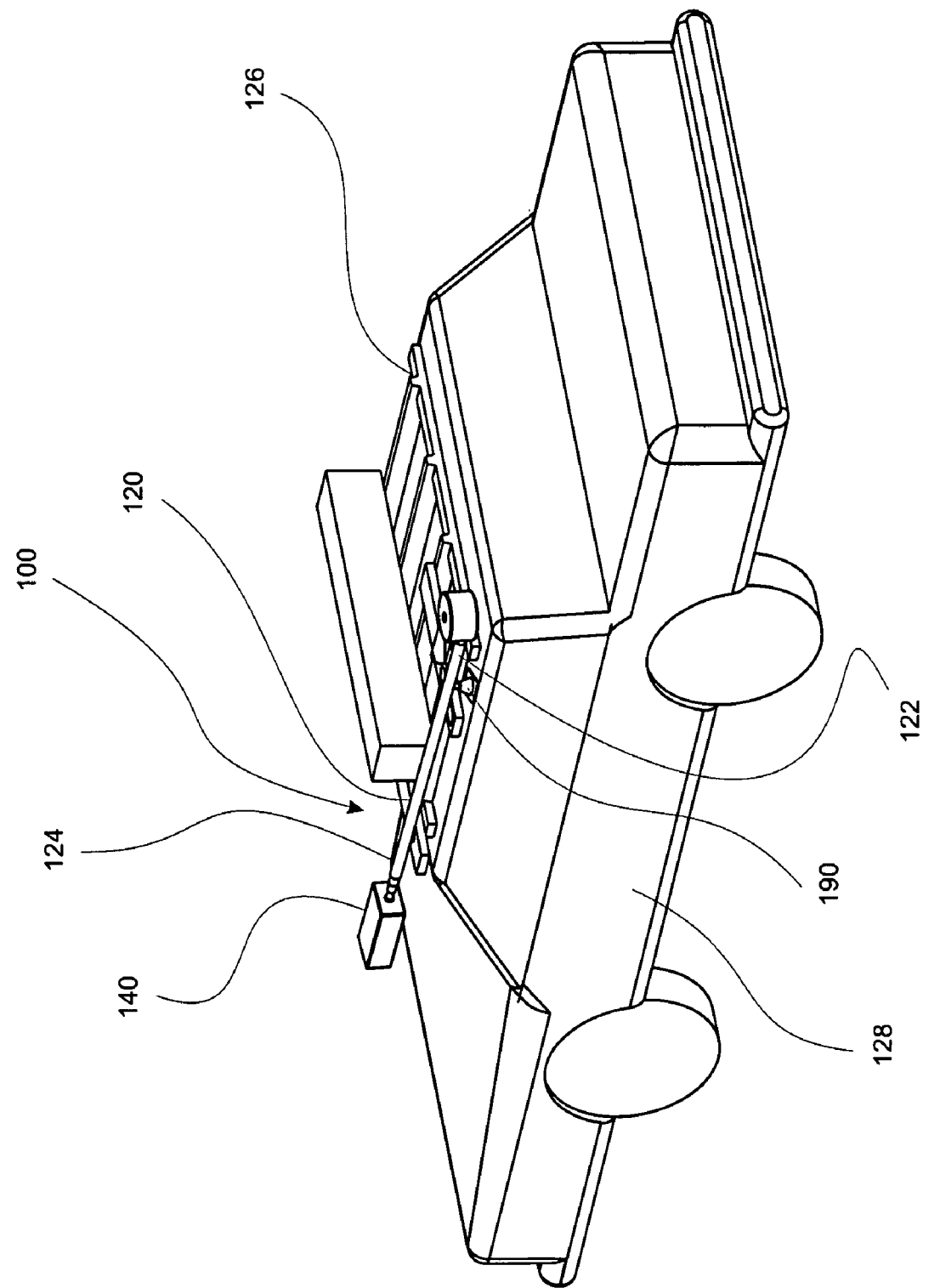
FIG. 1 is a perspective view of a vehicle observation apparatus according to the present invention, wherein a telescopic mast of the apparatus is mounted to the top of the roof of a law enforcement vehicle and in a non-extended or retracted position.

It should be understood that the above-attached figures are not intended to limit the scope of the present invention in any way.

DETAILED DESCRIPTION OF THE INVENTION

The present invention is directed to vehicle observation systems and devices, and vehicles equipped with vehicle observation systems or devices. More specifically, the invention is a vehicle observation apparatus 100, 300, 400, 500 for reducing the risk of injury to law enforcement persons or officers during vehicle or traffic stops. The invention is also a vehicle 200 equipped with a vehicle observation apparatus for reducing the risk of injury to law enforcement persons or officers during vehicle or traffic stops.

In a first embodiment and referring to FIGS. 1-5, the vehicle observation apparatus 100 comprises a telescopic boom or mast 120 deployable from a law enforcement vehicle, means 140 for two-way communication and observation secured about one end of the telescopic boom, means 160 for operating the telescopic boom, means 180 for operating the means for two-way communication and observation. The apparatus 100 may also comprise a mast or boom rotator 125 and means 190 for adjusting positioning of the mast or boom.

The vehicle observation apparatus of the present invention is indicated generally by the numeral 100, 300, 400 or 500.

The terms "telescopic boom" or "telescopic mast" are regarded herein as equivalent terms. The terms "vehicle stops" or "traffic stops" are regarded herein as equivalent terms. The terms "law enforcement persons" or "law enforcement officers" are regarded herein as equivalent terms, and represent law enforcement people working at the federal, state, and local levels.

Figure 2A:
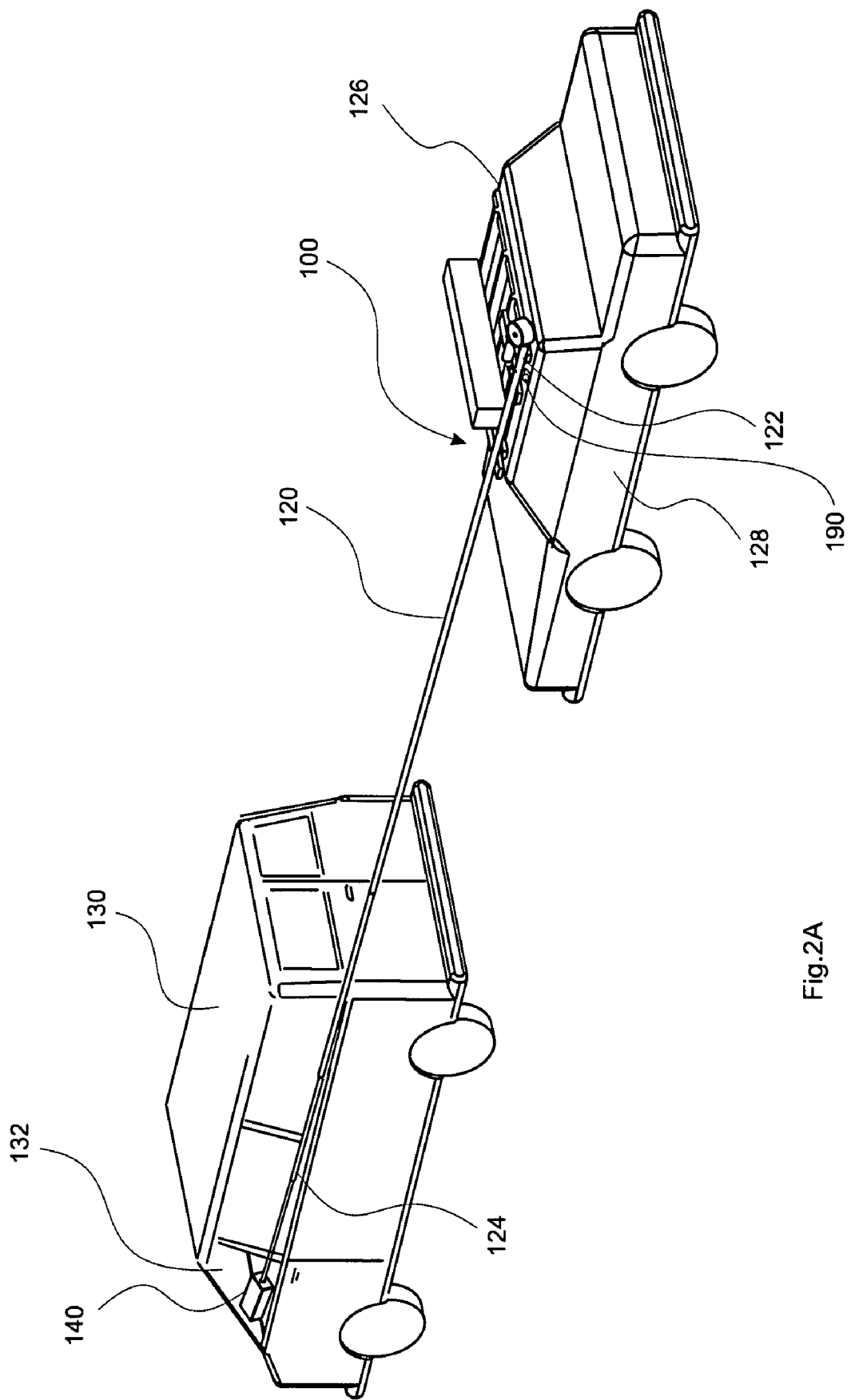
FIG. 2A is an environmental, perspective view of the vehicle observation apparatus of FIG. 1, wherein the law enforcement vehicle, with the telescopic mast in an extended position and a means for adjusting positioning of the mast of the apparatus allowing for height positioning of the mast, is involved in a vehicle or police stop with a vehicle having an above average height.
Figure 2B:
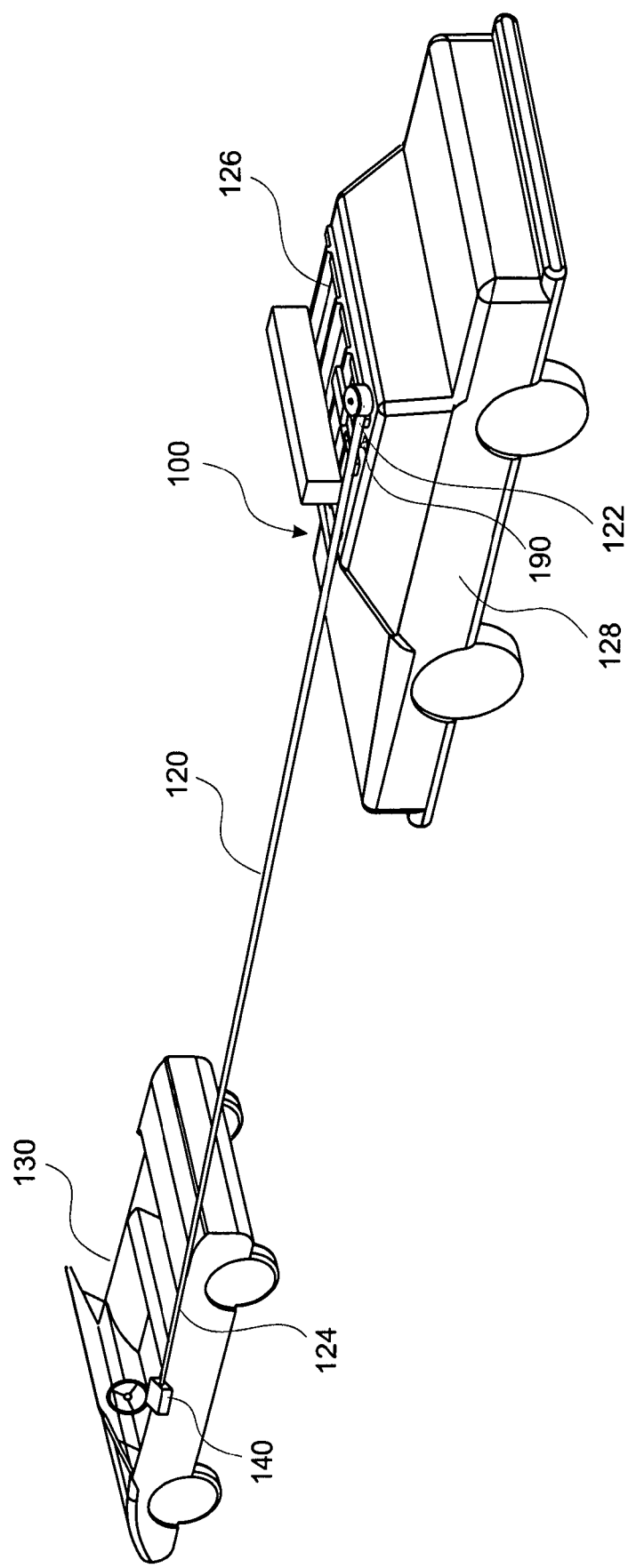
FIG. 2B is an environmental, perspective view of the vehicle observation apparatus of FIG. 1, wherein the law enforcement vehicle, with the mounted telescopic mast in an extended position and a means for adjusting positioning of the mast of the apparatus allowing for height positioning of the mast, is involved in a vehicle or police stop with a vehicle having below average height.

Referring to FIGS. 1-2B, the telescopic boom or mast 120 has a first end 122 (also referred to as proximal end when the boom 120 is in an extended position as shown in FIGS. 2A and 2B) and a second end 124 (also referred to as distal end when the boom 120 is in the extended position as shown in FIGS. 2A and 2B), and is attachable, affixable, securable or mountable to the top of the roof 126 of a law enforcement vehicle 128 at about the first or proximal end 122. It is obvious to one of ordinary skill in the art that the telescopic boom or mast 120 can be attached, affixed, secured or mounted to the top of the roof 126 of a law enforcement vehicle 128 at another location along the telescopic boom or mast 120, or to another location of the law enforcement vehicle 128.

Figure 5:
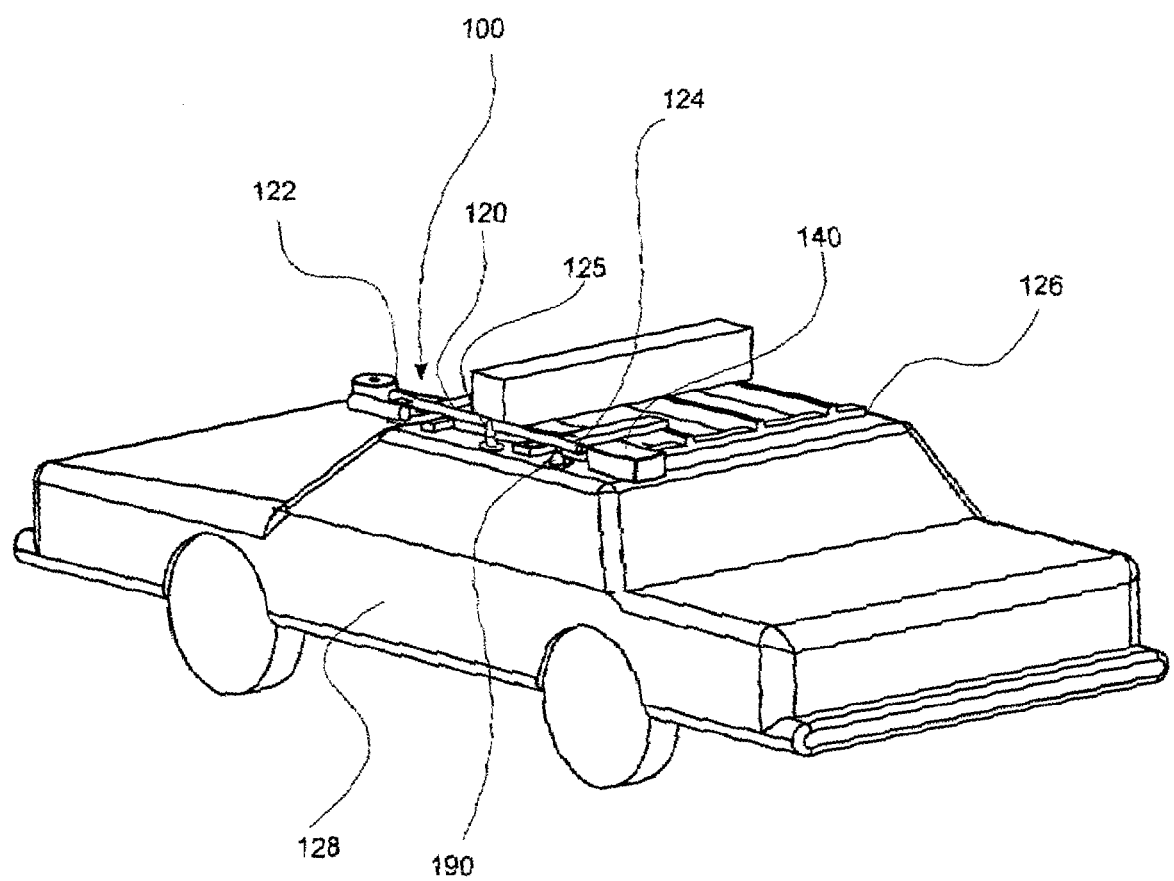
FIG. 5 is a perspective view of a vehicle observation apparatus according to the present invention, wherein the apparatus includes a mast rotator, wherein a telescopic mast of the apparatus is mounted to the top of the roof of a law enforcement vehicle, in a non-extended or retracted position, and pointed in a rearward direction relative to the law enforcement vehicle, and wherein the mast rotator is able to rotate the mast about 180 degrees (for pointing in a forward direction, or alternatively in a rearward direction, relative to the law enforcement vehicle) for applicable use during vehicle stops.

In this embodiment, the telescopic boom 120 is extendable from a non-extended or retracted position, as shown in FIG. 1, to a predetermined distance in front of the law enforcement vehicle 128. In another aspect of the embodiment, the telescopic boom 120 is extendable from a non-extended or retracted position to a predetermined distance in front of the law enforcement vehicle 128, and, with the use of a boom rotator 125 (as shown in FIG. 5) that is able to rotate the boom about 180 degrees, also to a predetermined distance behind the law enforcement vehicle 128. When in use, the boom rotator 125 can adjust its height to be higher than the height of the police siren and other roof accessories of the law enforcement vehicle 128 so that it can allow the boom 120 to rotate about 180 degrees. It is obvious to one of ordinary skill in the art that the telescopic boom 120 can be mounted to be only extendable from a non-extended or retracted position to a predetermined distance in front of the law enforcement vehicle 128, or to a predetermined distance behind the law enforcement vehicle 128. It is obvious to one of ordinary skill in the art that the vehicle observation apparatus of the present invention may include a mast or boom that is non-telescopic and is generally in an always-extended position so that the present invention may still perform effectively.

The means 140 for two-way communication and observation is secured about the second or distal end 124 of the telescopic boom 120. As shown in FIGS. 2A and 2B, it is preferred that the means 140 for two-way communication and observation is extended from a law enforcement vehicle 128 via the telescoping boom 120 that is mounted on the top of the roof 126 of the law enforcement vehicle 128 so as not to obstruct or impede established practices or procedure. The means 140 for two-way communication and observation provides for observation of the interior and at least one occupant of a stopped vehicle 130 during the vehicle stop and for two-way communication between a law enforcement person located in the law enforcement vehicle 128 and the at least one occupant located in the stopped vehicle.

Figure 3:
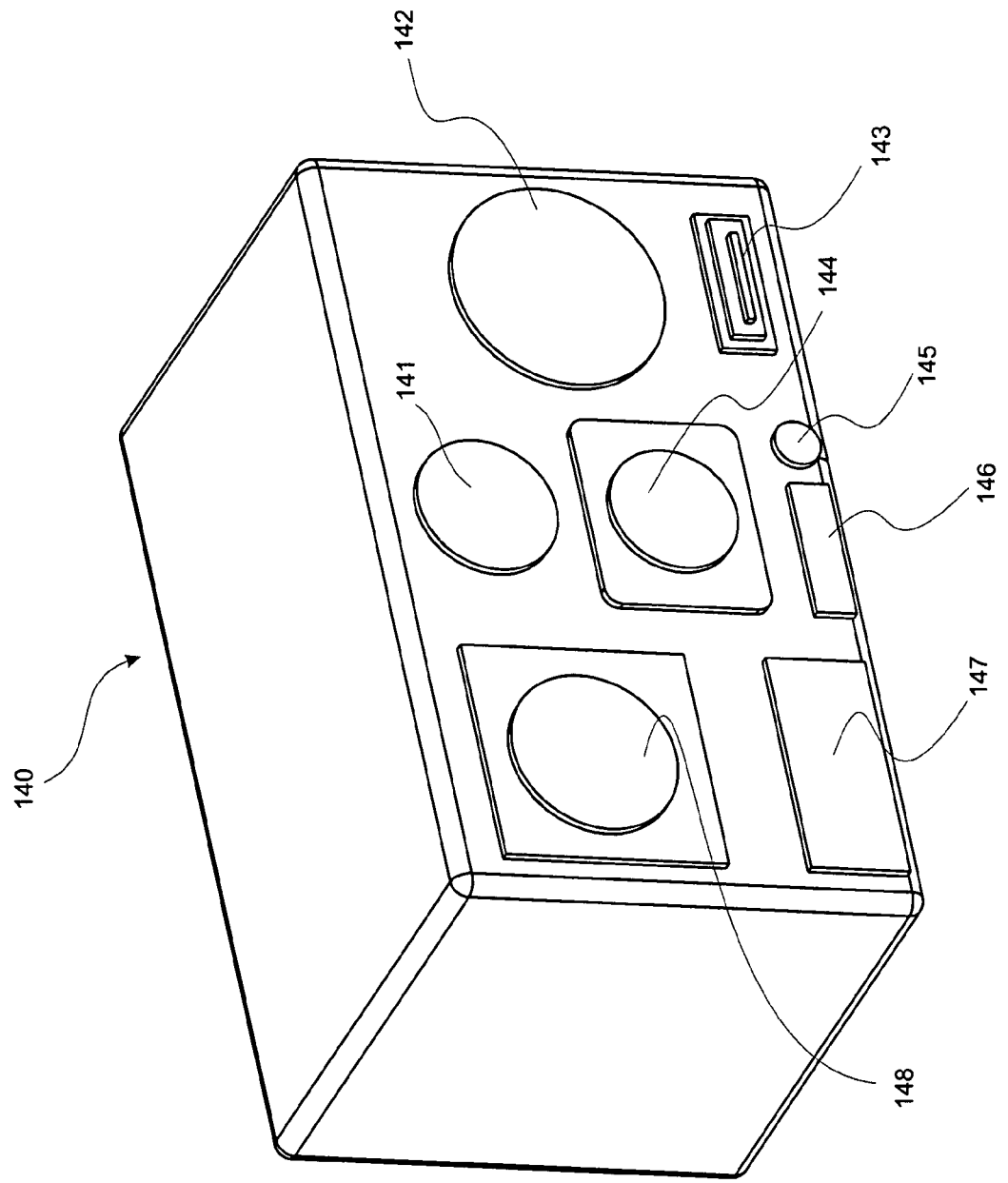
FIG. 3 is a perspective view of a means for two-way communication and observation of a vehicle observation apparatus of FIG. 1.

In one aspect of the invention (as shown in FIG. 3), the means 140 for two-way communication and observation is a remote controlled communication and observation device or box 140 that has incorporated into it any of the following, alone or in combination: a camera 142, a speaker 141, a microphone, an illumination device 144, a biometric recognition device 147, such as, but not limited to, a fingerprint reader or scanner, a facial recognition scanner, and an eye scanner, an RFID reader 143, and an infrared sensor 148 capable of detecting a hidden passenger in the stopped vehicle. It is obvious to one of ordinary skill in the art that the communication and observation box 140 may incorporate additional devices, such as a breathalyzer 145 or chemical sensor 146, that assist in the two-way communication and/or observation, or may contain fewer devices, while still allowing the box 140 to be effective.

Figure 4:
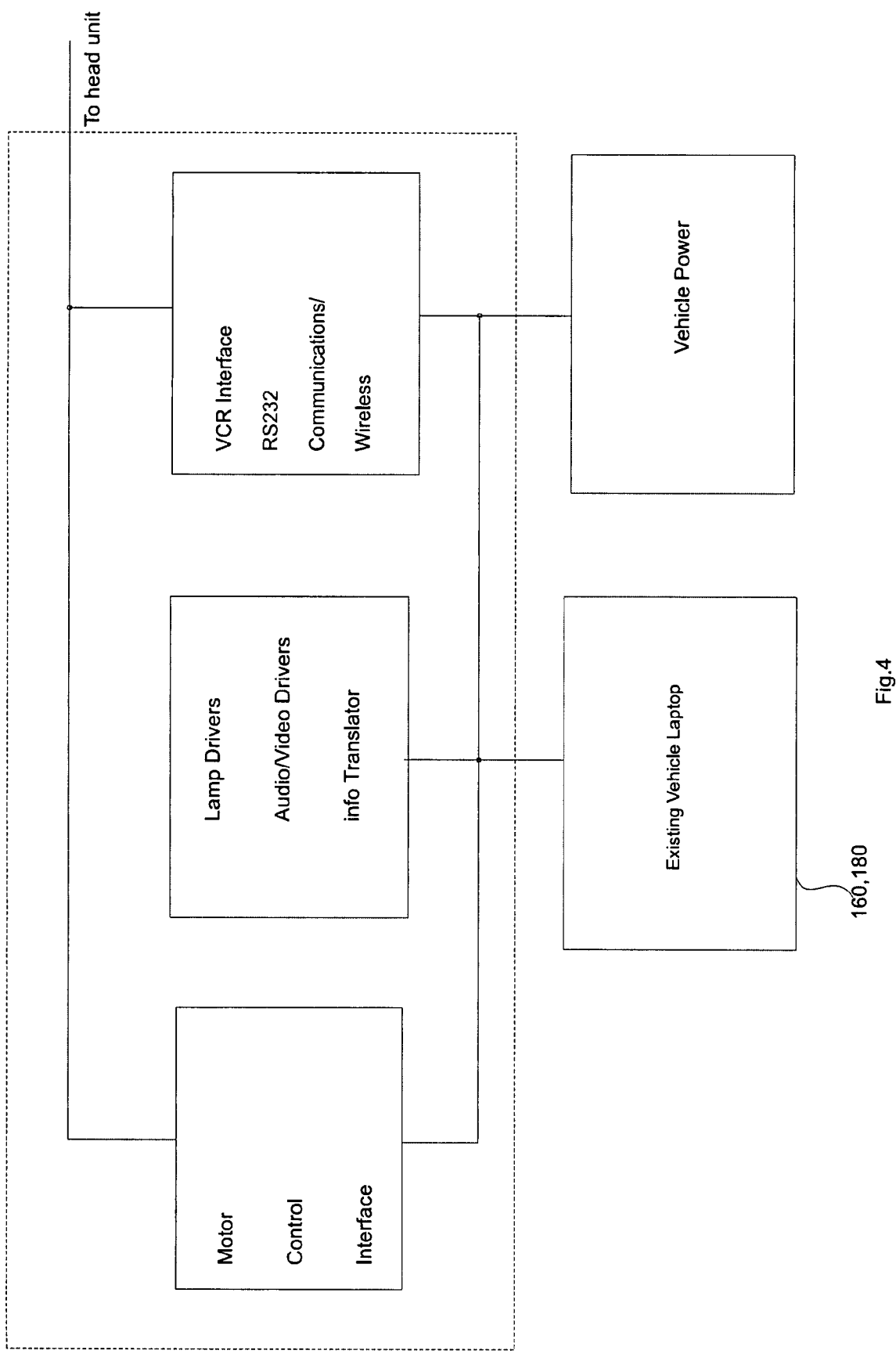
FIG. 4 is a schematic of a logical operation control of the vehicle observation apparatus of FIG. 1.

Referring to FIG. 4, the connections to the communication and observation box 140 are interfaced via a wired or wireless interface that is connected to the means 180 for operating the means for two-way communication and observation, such as a personal computer 180, which in most cases is already present in law enforcement vehicles 128. Wireless options can be via PCMCIA standard plug in or 802.11B using many of the NIST standards for transmission with WiFi, GJXDM, CDMA, GSM and GPRS.

In this aspect of the invention, the personal computer 180 will serve as the primary controller and interfacing device for data captured. The features provided with the personal computer 180 will allow for facial recognition, one-to-one match of driver and form of identification provided, and review and inspection of the stopped vehicle and all passengers and items present in the stopped vehicle. For simplicity, it is preferred that the personal computer 180 also has the ability to communicate with the passengers of the stopped vehicle 130.

The means 160 for operating the telescopic boom is able to communicate with the boom 120 to extend the boom 120 into an extended position from a non-extended or retracted position when the occasion, such as during a police or vehicle stop, calls for the means 140 for two-way communication and observation to be used. After a police or vehicle stop, the means 160 for operating the telescopic boom is able to communicate with the boom 120 to retract the boom into the non-extended or retracted position from the extended position.

In this non-limiting aspect of the invention, the means 160 for operating the telescopic boom and the means 180 for operating the means for two-way communication and observation may also be carried out by the personal computer located within the law enforcement vehicle 128. It should be understood to one of ordinary skill in the art that the means 160 for operating the telescopic boom and/or the means 180 for operating the means for two-way communication and observation may be carried out by other devices and/or systems located within the law enforcement vehicle 128 or at a remote location that is in communication with the law enforcement person or the law enforcement vehicle 128.

In use and from within the law enforcement vehicle 128, the law enforcement person or officer uses the personal computer control function to extend and guide the communication and observation box 140 via the telescopic boom or mast 120 to the driver side window 132 of the stopped vehicle 130. As the communication and observation box 140, which includes a camera, approaches the stopped vehicle 130, the law enforcement person can start a scan of the stopped vehicle 130 from back to front, or vice versa, so as to assess the vehicle 130 for potential passengers, such as passengers hiding or lying on the floor, or objects of danger, such as a firearm, within the vehicle 130.

The means 190 for adjusting positioning of the mast or boom allows for lateral and height positioning of the boom for optimal positioning of the means 140 for two-way communication and observation relative to the stopped vehicle. As a non-limiting example, the means 190 for adjusting positioning of the mast or boom may be a set of motorized worm gear mechanisms that will allow for lateral and height positioning for optimal positioning of the apparatus 100. The means 190 for adjusting positioning of the mast or boom will be placed about the first or proximal end 122 of the boom 120 so as to provide the greatest potential amount of motion at or about the arrangement point of the boom 120 and means 140 for two-way communication and observation.

Another example of the means 190 for adjusting positioning of the mast or boom to assemble and provide the boom 120 and means 140 for two-way communication and observation with X, Y, and Z positioning is to use a positioning table (X, Y, and Z table drive) which would be attached or secured as a unit to the roof mounted rack which allows for a secure and uniform placement along the length of the roof of the vehicle 128. The mast or boom assembly along with the positioning table can be secured with, but not limited to any of, the common hardware fastening devices such as "U" shaped clamps, adjustable fastening straps, and nuts and bolts found in any of the major hardware stores such as Home Depot or Lowe's. The positioning table is incorporated so that if needed slight adjustments can be provided for optimal alignment of the means 140 for two-way communication and observation to the subject in question, be it a stopped vehicle or a person.

As a non-limiting example, the mast or boom 120 may be secured or attached to a roof mounted rack, which is then secured or mounted to the roof of the law enforcement vehicle 128 with, but not limited to any of, the common hardware fastening devices such as "U"-shaped clamps, adjustable fastening straps, and nuts and bolts found in any of the major hardware stores such as Home Depot or Lowes.

The roof or gutter mounted rack and/or roof top assemblies mentioned as a non-limiting example can be found in many catalogs that sell vehicle roof mounted accessories and equipment racks such as myladders.com or North American signal company that are both found on the Internet. The racks mentioned are easily mounted because of the associated and varied hardware and mounting fixtures that are provided for the ease of a common individual to install to a vehicle without vehicle modification. The controls for the above said devices will be interconnected via standard connectors, wiring, and configurations that are common and standard in the industry with proven integration and performance. This is further exemplified by the fact that all technical components listed in said application provide technical support for applications and configurations.

Figure 6:
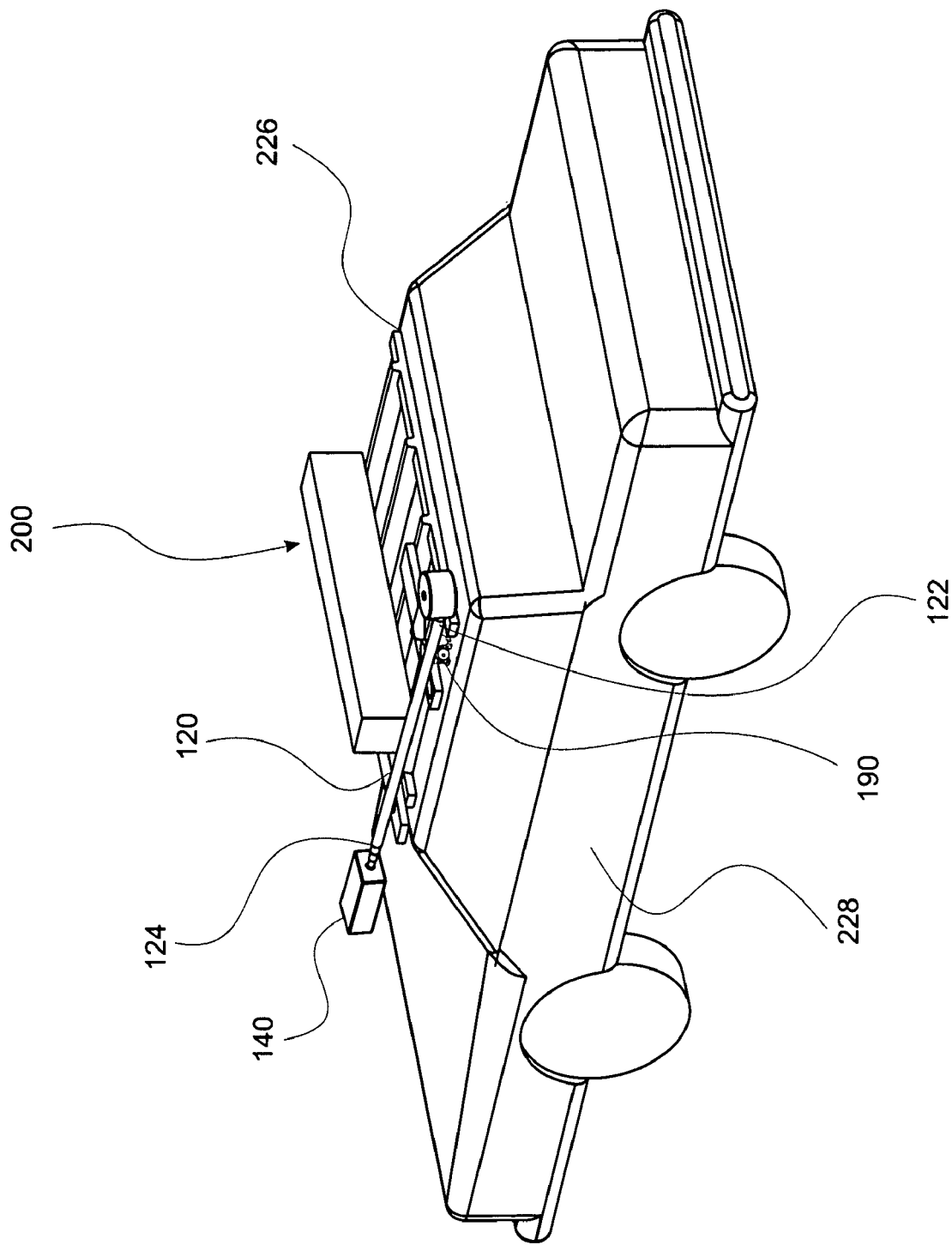
FIG. 6 is a perspective view of a vehicle equipped with a vehicle observation apparatus according to the present invention, wherein a telescopic mast of the apparatus is mounted to the top of the roof of the vehicle and in a non-extended or retracted position.

In a second embodiment of the present invention and referring to FIG. 6, the invention is a vehicle 200 for reducing the risk of injury to law enforcement persons during vehicle stops. The vehicle 200 is equipped with a vehicle observation apparatus, such as or similar to the vehicle observation apparatus 100 described in the first embodiment, that is attached, affixed, secured or mounted to the top of the roof 226 of a law enforcement vehicle 228.

Figure 7:
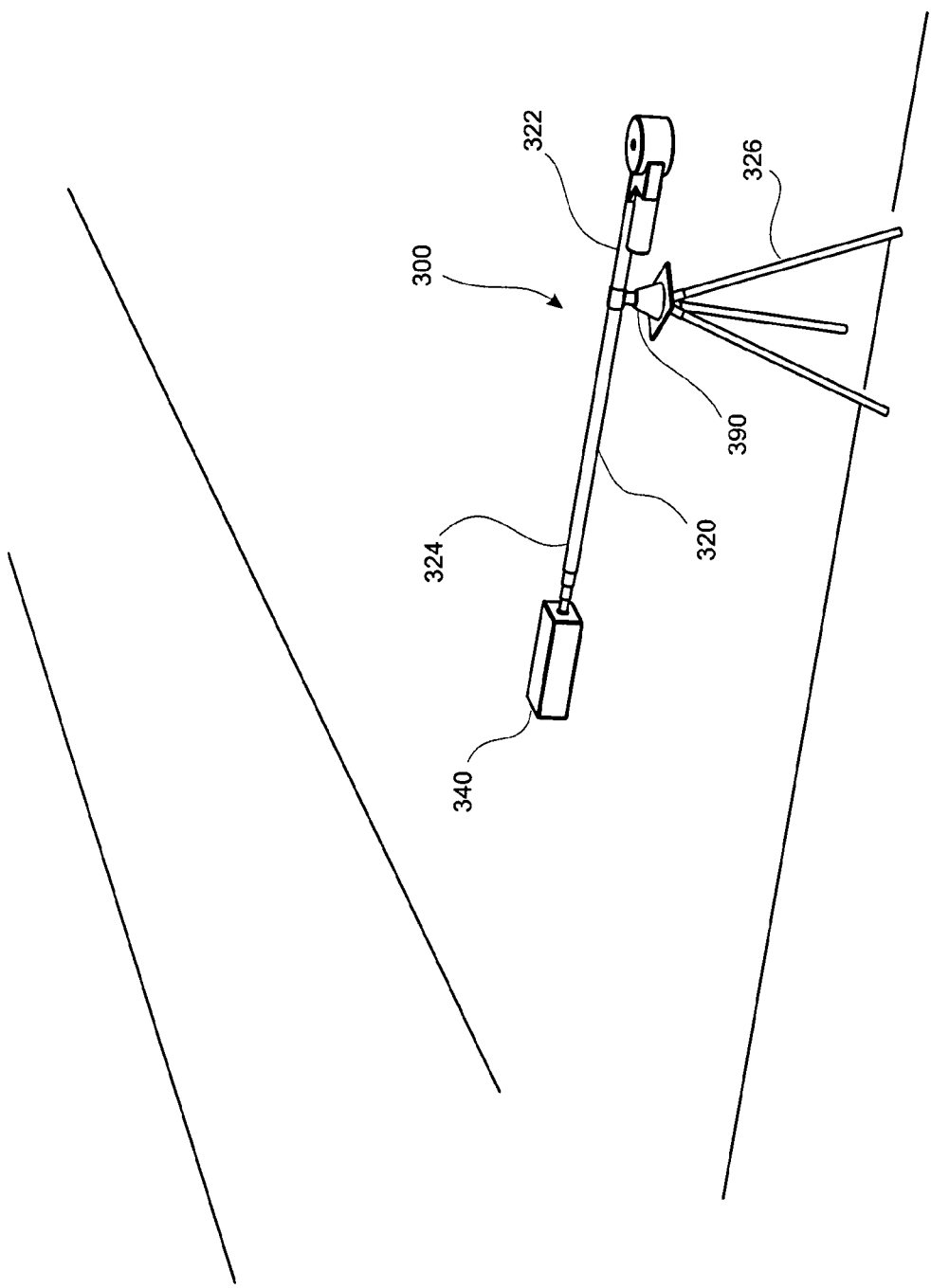
FIG. 7 is a perspective view of a vehicle observation apparatus according to the present invention, wherein a telescopic mast of the apparatus is mounted to a check point structure, such as a tripod, and in a non-extended or retracted position.
Figure 8:
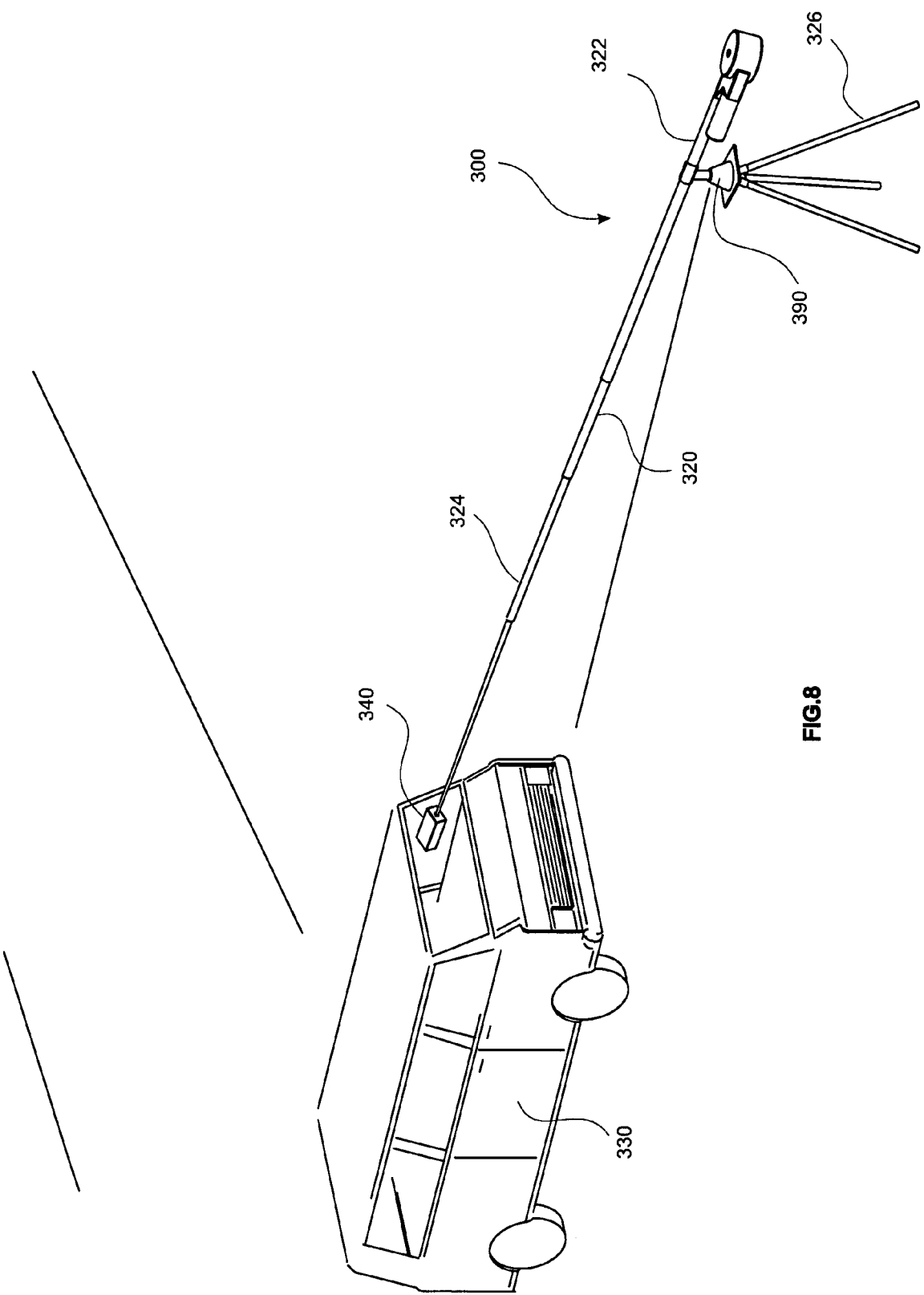
FIG. 8 is an environmental, perspective view of the vehicle observation apparatus of FIG. 7, wherein the check point structure, with the mast in an extended position and a means for adjusting positioning of the mast of the apparatus allowing for height positioning of the mast, is involved in a vehicle or police stop with a vehicle having an above average height.
Figure 9:
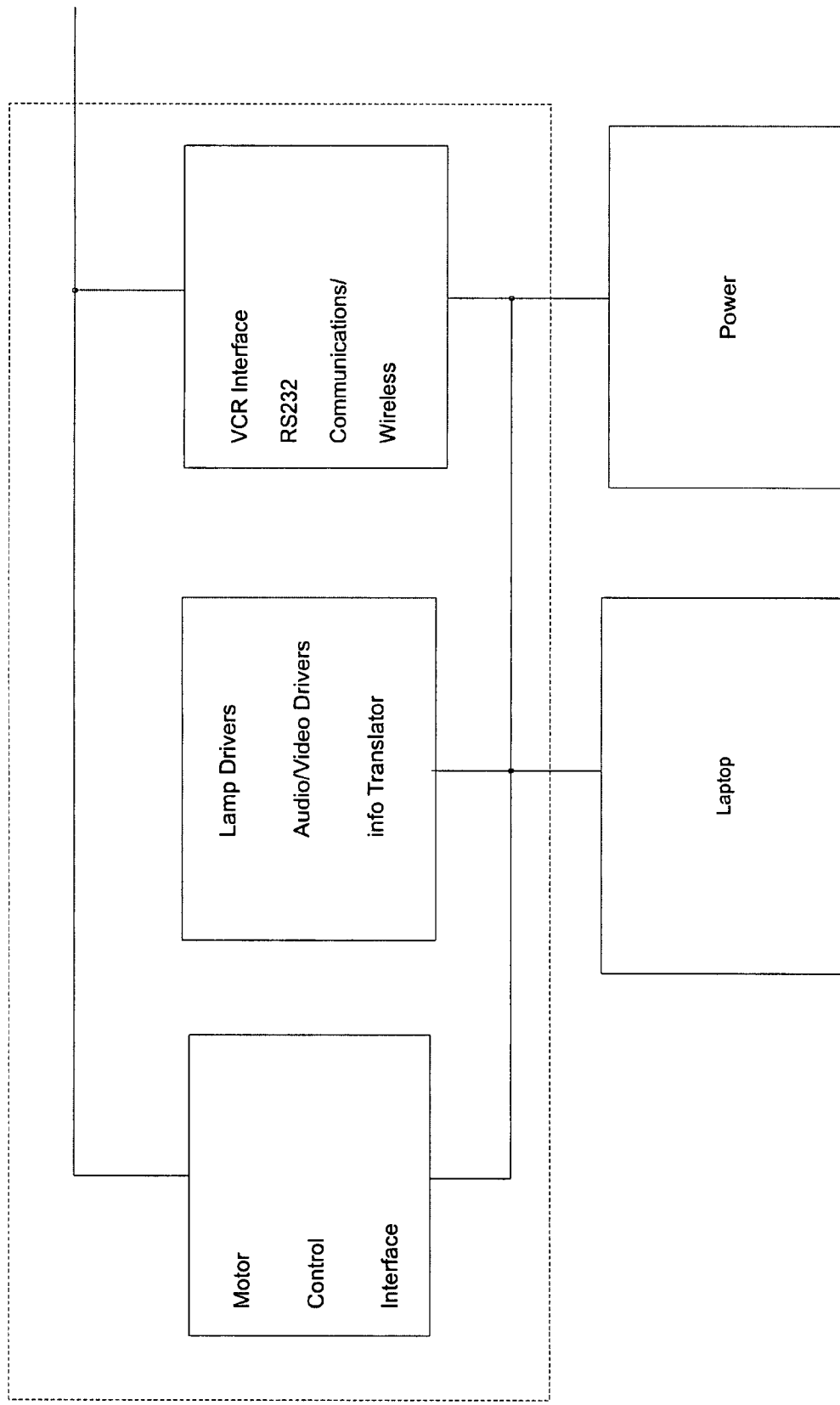
FIG. 9 is a schematic of a logical operation control of the vehicle observation apparatus of FIGS. 7, 10 and 11.

In a further embodiment and referring to FIGS. 7-9, the invention is a vehicle observation apparatus 300, such as or similar to the vehicle observation apparatus 100 described in the first embodiment, comprising a telescopic boom or mast 320 deployable from a check point location or structure 326, such as, but not limited to, a tripod 326, a security booth, a parking garage booth, a parking area booth, or a kiosk, means 340 for two-way communication and observation secured about one end of the telescopic boom, means 360 for operating the telescopic boom, means 380 for operating the means for two-way communication and observation, and means 390 for adjusting the position of means for two-way communication and observation. The apparatus 300 allows for a stopped vehicle 330 to be checked out at a predetermined distance away from the check point location or structure 326, a building structure (not shown), such as, but not limited to, a building, a parking garage, a parking area, a military installation or building or military living quarters, located in the vicinity of the check point structure 326, and/or attendant or law enforcement person located in the vicinity of the check point structure 326 such that the risk of harm to people and structures are reduced. It is obvious to one of ordinary skill in the art that the check point structure 326 may be attended or unattended by an attendant or law enforcement person, and may, or may not, be located in the vicinity of a building structure (not shown).

Referring to FIGS. 7 and 8, the telescopic boom or mast 320 has a first end 322 (also referred to as proximal end when the boom 320 is in an extended position as shown in FIG. 8) and a second end 324 (also referred to as distal end when the boom 320 is in the extended position as shown in FIG. 8), and is attachable, affixable, securable or mountable to the check point structure 326 at various positions along the telescopic boom or mast 320. In this embodiment, the telescopic boom 320 is extendable from a non-extended or retracted position to a predetermined distance in front of the check point structure 326.

The means 340 for two-way communication and observation is secured about the second or distal end 324 of the telescopic boom 320. It is preferred that the means 340 for two-way communication and observation is extended from a check point structure 326 via the telescoping boom 320 that is mounted to the check point structure 326. The means 340 for two-way communication and observation provides for observation of at least one occupant in a stopped vehicle 330 during the vehicle stop and for two-way communication between an attendant or law enforcement person, located in or in communication with the check point structure 326, and the at least one occupant of the stopped vehicle.

In a non-limiting aspect of the invention, the means 340 for two-way communication and observation may be similar to or the same as the means 140 for two-way communication and observation described in the first embodiment.

The connections to the communication and observation box 340 are interfaced via a wired or wireless interface that is connected to the means 380 for operating the means for two-way communication and observation, such as a personal computer 380, which may be located in or in communication with the check point structure 326. Wireless options can be via PCMCIA standard plug in or 802.11B using many of the NIST standards for transmission with WiFi, GJXDM, CDMA, GSM and GPRS.

In this aspect of the invention, the personal computer 380 will serve as the primary controller and interfacing device for data captured. The features provided with the personal computer 380 will allow for facial recognition, one-to-one match of driver and form of identification provided, and review and inspection of the stopped vehicle and all passengers and items present in the vehicle. For simplicity, it is preferred that the personal computer 380 also has the ability to communicate with the passengers of the stopped vehicle (not shown).

The means 360 for operating the telescopic boom is able to communicate with the boom 320 to extend the boom 320 into an extended position from a non-extended or retracted position when the occasion, such as during a police or vehicle stop, calls for the means 340 for two-way communication and observation to be used. After a police or vehicle stop, the means 360 for operating the telescopic boom is able to communicate with the boom 320 to retract the boom 320 into the non-extended or retracted position from the extended position.

In this non-limiting aspect of the invention and referring to FIG. 9, the means 360 for operating the telescopic boom and the means 380 for operating the means for two-way communication and observation may also be carried out by the personal computer that is located in or in communication with the check point structure 326. It should be understood to one of ordinary skill in the art that the means 360 for operating the telescopic boom and/or the means 380 for operating the means for two-way communication and observation may be carried out by other devices and/or systems located in or in communication with the check point structure 326.

In use and from within or in communication with the check point structure 326, the attendant or law enforcement person uses the personal computer control function to extend and guide the communication and observation box 340 via the telescopic boom or mast 320 to the drivers side window of the stopped vehicle (not shown). As the communication and observation box 340, which includes a camera, approaches the stopped vehicle, the law enforcement person can start a scan of the stopped vehicle from back to front, or vice versa, so as to assess the stopped vehicle for potential passengers, such as passengers hiding or lying on the floor, or objects of danger, such as a firearm or explosives, within the stopped vehicle.

Figure 10:
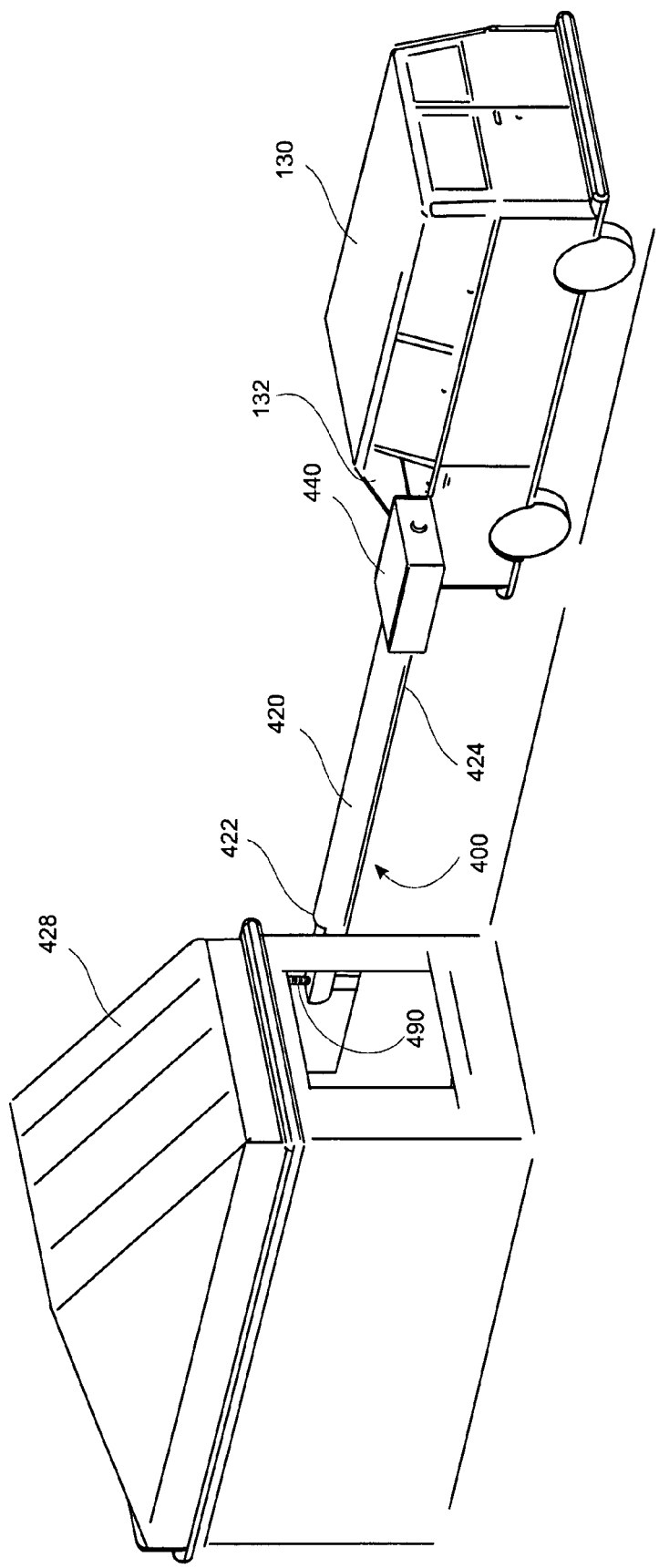
FIG. 10 is an environmental, perspective view of a vehicle observation apparatus according to the present invention, wherein a non-telescopic mast of the apparatus is mounted to a check point structure, such as a booth, and in an extended position and a means for adjusting positioning of the mast of the apparatus is allowing for height positioning of the mast, and wherein the check point structure is involved in a vehicle or police stop with a vehicle having an above average height.

In an additional embodiment and referring to FIG. 10, the invention is a vehicle observation apparatus 400 comprising a non-telescopic boom or mast 420 in an extended position when in use relative to a check point location or structure 426, such as, but not limited to, a tripod, a security booth 426, a parking garage booth, a parking area booth, or a kiosk, means 440 for two-way communication and observation secured about one end of the non-telescopic boom, means 480 for operating the means for two-way communication and observation, and means 490 for adjusting the position of means for two-way communication and observation. The apparatus 400 is somewhat similar to the apparatus 300, except the apparatus 400 includes the non-telescopic boom or mast 420 and does not include means for operating the boom or mast.

The non-telescopic boom or mast 420 has a first end 422 (also referred to as proximal end) and a second end 424 (also referred to as distal end), and is attachable, affixable, securable or mountable to the check point structure 426 at various positions along the non-telescopic boom or mast 420. As a non-limiting aspect of this embodiment, the non-telescopic boom 420 is, preferably most or all of the time, in an extending position, which means that the boom 420 cannot be retracted into a non-extended position and means that the boom 420 (along with the means 440 for two-way communication and observation that is secured at the second end 424 of the boom 420) is a predetermined distance in front of the check point structure 426 for most or all of the time.

Other than the above-mentioned differences, the other devices or components of the apparatus 400 may be substantially similar to or have substantially similar functions to those corresponding devices or components of the other apparatuses 100, 200, 300.

Figure 11:
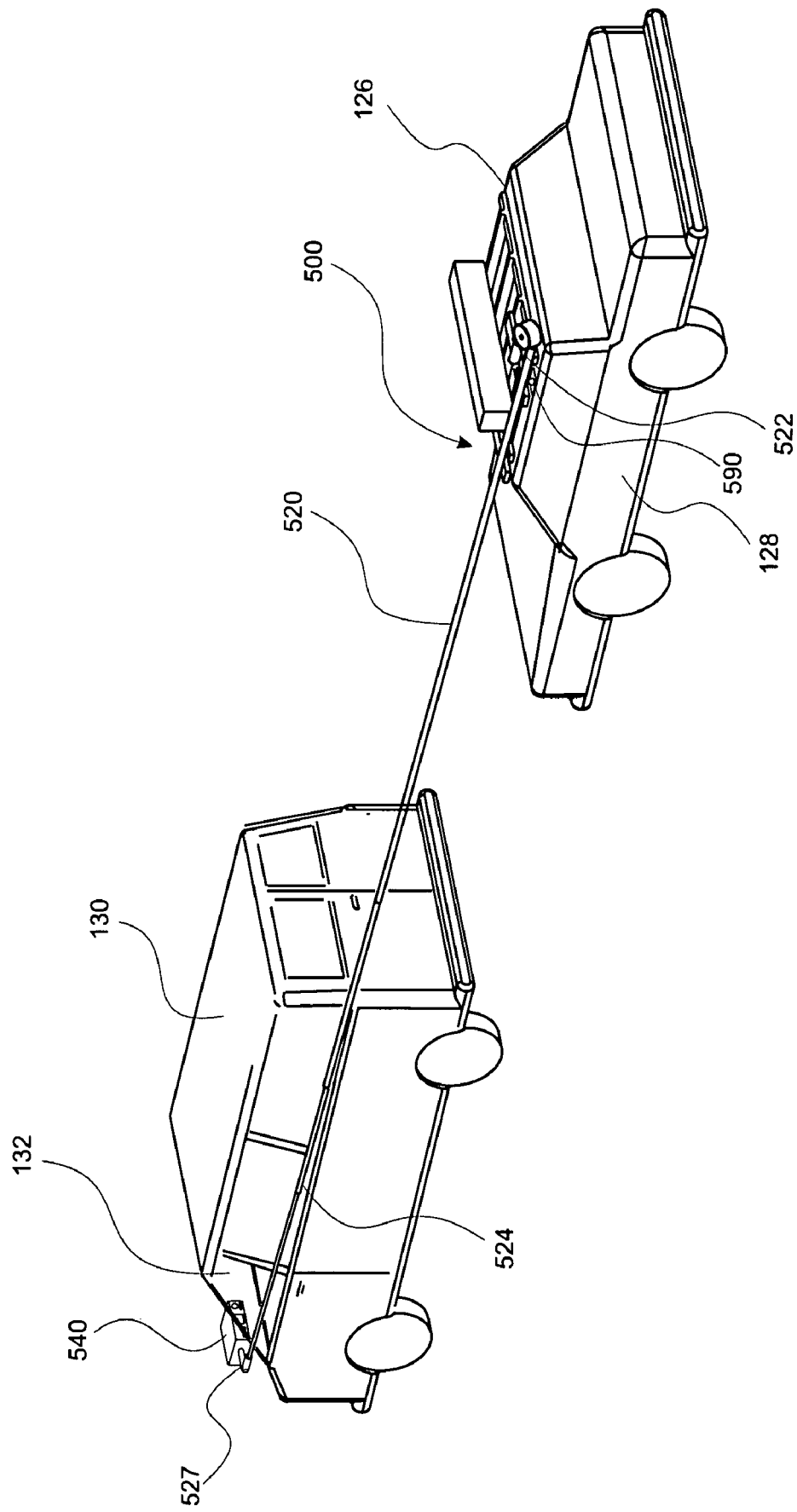
FIG. 11 is an environmental, perspective view of a vehicle observation apparatus according to the present invention, wherein a telescopic mast of the apparatus is mounted to the top of the roof of a law enforcement vehicle, with the telescopic mast in an extended position, a means for adjusting positioning of the mast of the apparatus allowing for height positioning of the mast, and an articulated joint interfaced with the mast and means for two-way communication and observation, is involved in a vehicle or police stop with a vehicle having an above average height.

In a further embodiment of the invention with no changes in function but only in mobility of the means 540 for two-way communication and observation, an articulated joint 527 (as shown in FIG. 11) will be interfaced with the mast or boom 520 having at least a first end 522 and a second end 524, and the means 540 for two-way communication and observation. The incorporation of the articulated joint 527 about the second end 524 of the boom 520 will provide greater control of motion of the means 540 for two-way communication and observation by providing rotation in all axes. The incorporation of an articulated device 527 is a standard practice to allow robotic devices to have three-dimensional motion with a single device interface and control.

Many or all of the systems and or devices used in the apparatus 100, 200, 300, 400, 500 are commercially available at several different vendors which has been proven by the redundancy found during any given search for a particular item. In the case of a positioning table mentioned above, Techno Inc. is a prime provider for custom and off the shelf positioning systems that would be used to provide the optimal positioning of the device 140, 340, 440, 540 by the means of having motion in the vertical, and horizontal plane.

As a non-limiting example of the aspect of the invention, the assembly of the communication and observation box 140, 340, 440, 540 may incorporate off the shelf components for ease of manufacturability and maintainability. The camera, telescoping boom or mast, and other components used are commercially available from several manufacturers, thus providing benefits for modifications and enhancements. For example, the telescopic boom or mast is a commercially available item from vendors such as Clark Mast USA or Will Burt Mast Systems. The camera can be found at vendors such as Brickhouse.com or Webcamproshop.com, and both vendors have a camera meeting or exceeding the requirements and need for said invention. Both vendors have commercially available units providing for wired and wireless imaging such as the Sony SNC RZ25n or the Vivotek PZ 6114. Both applications can be controlled via a personal computer or the addition of a control system such as the ones provided by Aerocomm.com or by 1 PC network Inc. (www.1pcn.com). The means for communication within said device 140, 340, 440, 540 such as the speaker, can be found at a distributor such as Radio Shack Inc. or www.poormansboating.com.

Biometric recognition can be accomplished by the use of equipment and software provided by Face Technologies (www.face.co.za) and Identix (www.identix.com), with both being leading providers of facial and finger recognition devices to companies implementing biometrics into the work environment. Infrared imaging can be accomplished with equipment provided by companies such as ICX (www.icxt.com) which have a model Vision IR or similar devices such as the IR-235 DX found at Imaging1.com.

The interconnection for the apparatus 100, 200, 300, 400, 500 is accomplished by wired or wireless means. The wired means for communication is as implied, the output of any said device will have the output of said device wired to the appropriate driver and from the driver circuit routed to the PC which will serve as the main controller. The devices used in said device have the capability for external configurations via Rs 232 ports or associated wireless capability. The above description of connectivity is well understood and logical in the assembly and or interconnectivity of different technologies due to the built in flexibility during development to ensure broad marketability and inclusion with the respective technology.

As in a wired option, the wireless options are varied due to the development for marketability that companies seek in the market. Wireless capability can be via PCMCIA standard plug in or 802.11B using many of the NIST standards for transmission with WiFi, GJXDM, CDMA, GSM and GPRS. The controls for the above said devices will be interconnected via standard connectors, wiring, and configurations that are common and standard in the industry with proven integration and performance. This is further exemplified by the fact that all technical components listed in said application have technical support for enabling said device integration and applications.

It is to be understood that the present invention is not limited to the embodiments described above or as shown in the attached figures, but encompasses any and all embodiments within the spirit of the invention.

What is claimed is:

1. A vehicle observation apparatus for use during a vehicle stop, said apparatus comprising:

a telescopic mast adapted for being secured to a law enforcement vehicle and being deployable from the law enforcement vehicle toward a stopped vehicle during a vehicle stop, said mast having at least a first end and a second end, and being adapted to be placed in at least a first position and a second position, wherein said mast is extendable from said first position toward said second position for a predetermined distance from the law enforcement vehicle toward the stopped vehicle whereby at least one law enforcement person in connection with the law enforcement vehicle is able to perform observation of an interior and at least one occupant of the stopped vehicle and to communicate with the at least one occupant of the stopped vehicle;

means for two-way communication and observation being in communication with said mast, wherein said means for two-way communication and observation provides for observation of the interior and the at least one occupant of the stopped vehicle and for two-way communication between the at least one law enforcement person and the least one occupant in the stopped vehicle when said mast is extended from said first position toward said second position for a predetermined distance from the law enforcement vehicle toward the stopped vehicle;

means for operating said mast, wherein said means for operating said mast is able to communicate with said mast to extend said mast from said first position of said mast toward said second position of said mast for a predetermined distance from the law enforcement vehicle toward the stopped vehicle, and wherein said means for operating said mast is able to retract said mast from said second position toward said first position; and means for operating said means for two-way communication and observation, wherein said means for operating said means for two-way communication and observation is able to communicate with said means for two-way communication and observation to provide for observation of the interior and the at least one occupant of the stopped vehicle and for two-way communication between the at least one law enforcement person and the least one occupant in the stopped vehicle.

2. The apparatus according to claim 1, wherein said means for two-way communication and observation comprises at least a speaker, a microphone, and at least one device selected from the group consisting of a camera, an illumination device, a biometric recognition device, an RFID reader, and an infrared sensor.

3. The apparatus according to claim 1, wherein said means for operating said mast is selected from the group consisting of a computer located within the law enforcement vehicle and a computer located at a remote location.

4. The apparatus according to claim 1, wherein said means for operating said means for two-way communication and observation is selected from the group consisting of a computer located within the law enforcement vehicle and a computer located at a remote location.

5. The apparatus according to claim 1, further comprising means for adjusting positioning of said mast, wherein said means for adjusting positioning of said mast allows for lateral and height positioning of said mast for optimal positioning of said means for two-way communication and observation relative to the stopped vehicle.

6. The apparatus according to claim 1, further comprising a mast rotator, wherein said mast rotator allows said mast to pivot about 180 degrees whereby said mast is extendable from said first position toward said second position for a predetermined distance from the law enforcement vehicle toward a stopped vehicle in an opposite second direction relative to the first direction of the extension of said mast.

7. The apparatus according to claim 1, further comprising an articulated joint interfaced with said mast and said means for two-way communication and observation.

8. A vehicle observation apparatus for use during a vehicle stop, said apparatus comprising:

a mast adapted for being secured to a law enforcement vehicle and being directed from the law enforcement vehicle toward a stopped vehicle during a vehicle stop, said mast having at least a first end, a second end, and an extended position, wherein said mast is positioned in said extended position in a first direction from the law enforcement vehicle toward the stopped vehicle whereby at least one law enforcement person in connection with the law enforcement vehicle is able to perform observation of an interior and at least one occupant of the stopped vehicle and to communicate with the at least one occupant of the stopped vehicle;

means for two-way communication and observation being in communication with said mast, wherein said means for two-way communication and observation provides for observation of the interior and the at least one occupant of the stopped vehicle and for two-way communication between the at least one law enforcement person and the least one occupant in the stopped vehicle when said mast is in a proper position relative to the stopped vehicle; and means for operating said means for two-way communication and observation, wherein said means for operating said means for two-way communication and observation is able to communicate with said means for two-way communication and observation to provide for observation of the interior and the at least one occupant of the stopped vehicle and for two-way communication between the at least one law enforcement person and the least one occupant in the stopped vehicle.

9. The apparatus according to claim 8, wherein said means for two-way communication and observation comprises at least a speaker, a microphone, and at least one device selected from the group consisting of a camera, an illumination device, a biometric recognition device, an RFID reader, and an infrared sensor.

10. The apparatus according to claim 8, wherein said means for operating said means for two-way communication and observation is selected from the group consisting of a computer located within the law enforcement vehicle and a computer located at a remote location.

11. The apparatus according to claim 8, further comprising means for adjusting positioning of said mast, wherein said means for adjusting positioning of said mast allows for lateral and height positioning of said mast for optimal positioning of said means for two-way communication and observation relative to the stopped vehicle.

12. The apparatus according to claim 8, further comprising a mast rotator, wherein said mast rotator allows said mast to pivot about 180 degrees whereby said mast is extended from the law enforcement vehicle toward a stopped vehicle in an opposite second direction relative to the first direction of the extension of said mast.

13. The apparatus according to claim 8, further comprising an articulated joint interfaced with said mast and said means for two-way communication and observation.

14. A vehicle observation apparatus for use during a vehicle stop, said apparatus comprising:
- a telescopic mast adapted for being secured to a check point structure and being deployable from the check point structure toward a stopped vehicle during a vehicle stop, said mast having at least a first end and a second end, and being adapted to be placed in at least a first position and a second position, wherein said mast is extendable from said first position toward said second position for a predetermined distance forward from the check point structure toward the stopped vehicle whereby at least one person in connection or communication with the check point structure is able to perform observation of an interior and at least one occupant of the stopped vehicle and to communicate with the at least one occupant of the stopped vehicle;
- means for two-way communication and observation being in communication with said mast, wherein said means for two-way communication and observation provides for observation of the interior and the at least one occupant of the stopped vehicle and for two-way communication between the at least one person and the least one occupant in the stopped vehicle when said mast is extended from said first position toward said second position for a predetermined distance forward from the check point structure toward the stopped vehicle;
- means for operating said mast, wherein said means for operating said mast is able to communicate with said mast to extend said mast from said first position of said mast toward said second position of said mast for a predetermined distance forward from the check point structure toward the stopped vehicle, and wherein said means for operating said mast is able to retract said mast from said second position toward said first position; and
- means for operating said means for two-way communication and observation, wherein said means for operating said means for two-way communication and observation is able to communicate with said means for two-way communication and observation to provide for observation of the interior and the at least one occupant of the stopped vehicle and for two-way communication between the at least one person and the least one occupant in the stopped vehicle.

15. The apparatus according to claim 14, wherein said means for two-way communication and observation comprises at least a speaker, a microphone, and at least one device selected from the group consisting of a camera, an illumination device, a biometric recognition device, an RFID reader, and an infrared sensor.

16. The apparatus according to claim 14, wherein said means for operating said mast is selected from the group consisting of a computer located within the check point structure, a computer located within a predetermined distance about the check point structure, and a computer located at a remote location.

17. The apparatus according to claim 14, wherein said means for operating said means for two-way communication and observation is selected from the group consisting of a computer located within the check point structure, a computer located within a predetermined distance about the check point structure, and a computer located at a remote location.

18. The apparatus according to claim 14, further comprising means for adjusting positioning of said mast, wherein said means for adjusting positioning of said mast allows for lateral and height positioning of said mast for optimal positioning of said means for two-way communication and observation relative to the stopped vehicle.

19. The apparatus according to claim 14, further comprising an articulated joint interfaced with said mast and said means for two-way communication and observation.

20. A vehicle observation apparatus for use during a vehicle stop, said apparatus comprising:
- a mast adapted for being secured to a check point structure and being directed from the check point structure toward a stopped vehicle during a vehicle stop, said mast having at least a first end, a second end, and an extended position, wherein said mast is positioned in said extended position in a direction from the check point structure toward the stopped vehicle whereby at least one person in connection or communication with the check point structure is able to perform observation of an interior and at least one occupant of the stopped vehicle and to communicate with the at least one occupant of the stopped vehicle;
- means for two-way communication and observation being in communication with said mast, wherein said means for two-way communication and observation provides for observation of the interior and the at least one occupant of the stopped vehicle and for two-way communication between the at least one person and the least one occupant in the stopped vehicle when said mast is in a proper position relative to the stopped vehicle; and
- means for operating said means for two-way communication and observation, wherein said means for operating said means for two-way communication and observation is able to communicate with said means for two-way communication and observation to provide for observation of the interior and the at least one occupant of the stopped vehicle and for two-way communication between the at least one person and the least one occupant in the stopped vehicle.

21. The apparatus according to claim 20, wherein said means for two-way communication and observation comprises at least a speaker, a microphone, and at least one device selected from the group consisting of a camera, an illumination device, a biometric recognition device, an RFID reader, and an infrared sensor.

22. The apparatus according to claim 20, wherein said means for operating said means for two-way communication and observation is selected from the group consisting of a computer located within the check point structure, a computer located within a predetermined distance about the check point structure, and a computer located at a remote location.

23. The apparatus according to claim 20, further comprising means for adjusting positioning of said mast, wherein said means for adjusting positioning of said mast allows for lateral and height positioning of said mast for optimal positioning of said means for two-way communication and observation relative to the stopped vehicle.

24. The apparatus according to claim 20, further comprising an articulated joint interfaced with said mast and said means for two-way communication and observation.

25. A law enforcement vehicle for use during a vehicle stop, said vehicle comprising a law enforcement vehicle adapted for being equipped with a vehicle observation apparatus,
- wherein said vehicle observation apparatus comprises:
    - a telescopic mast adapted for being secured to said vehicle and being deployable from said vehicle toward a stopped vehicle during a vehicle stop, said mast having at least a first end and a second end, and being adapted to be placed in at least a first position and a second position, wherein said mast is extendable from said first position toward said second position for a predetermined distance from said vehicle toward the stopped vehicle whereby at least one law enforcement person in connection with said vehicle is able to perform observation of an interior and at least one occupant of the stopped vehicle and to communicate with the at least one occupant of the stopped vehicle, means for two-way communication and observation being in communication with said mast, wherein said means for two-way communication and observation provides for observation of the interior and the at least one occupant of the stopped vehicle and for two-way communication between the at least one law enforcement person and the least one occupant in the stopped vehicle when said mast is extended from said first position toward said second position for a predetermined distance from said vehicle toward the stopped vehicle, means for operating said mast, wherein said means for operating said mast is able to communicate with said mast to extend said mast from said first position of said mast toward said second position of said mast for a predetermined distance from said vehicle toward the stopped vehicle, and wherein said means for operating said mast is able to retract said mast from said second position toward said first position, and means for operating said means for two-way communication and observation, wherein said means for operating said means for two-way communication and observation is able to communicate with said means for two-way communication and observation to provide for observation of the interior and the at least one occupant of the stopped vehicle and for two-way communication between the at least one law enforcement person and the least one occupant in the stopped vehicle.

26. The apparatus according to claim 25, wherein said means for two-way communication and observation comprises at least a speaker, a microphone, and at least one device selected from the group consisting of a camera, an illumination device, a biometric recognition device, an RFID reader, and an infrared sensor.

27. The apparatus according to claim 25, wherein said means for operating said mast is selected from the group consisting of a computer located within said vehicle and a computer located at a remote location.

28. The apparatus according to claim 25, wherein said means for operating said means for two-way communication and observation is selected from the group consisting of a computer located within said vehicle and a computer located at a remote location.

29. The apparatus according to claim 25, further comprising means for adjusting positioning of said mast, wherein said means for adjusting positioning of said mast allows for lateral and height positioning of said mast for optimal positioning of said means for two-way communication and observation relative to the stopped vehicle.

30. The apparatus according to claim 25, further comprising a mast rotator, wherein said mast rotator allows said mast to pivot about 180 degrees whereby said mast is extendable from said first position toward said second position for a predetermined distance from said vehicle toward a stopped vehicle in an opposite second direction relative to the first direction of the extension of said mast.

31. The apparatus according to claim 25, further comprising an articulated joint interfaced with said mast and said means for two-way communication and observation.

* * * * *